United States Patent [19]

Hurst et al.

[11] Patent Number: 4,699,751

[45] Date of Patent: Oct. 13, 1987

[54] NEUTRON DOSIMETER

[75] Inventors: G. Samuel Hurst, Roane County; Harold W. Schmitt; Norbert Thonnard, both of Anderson County, all of Tenn.; Tom J. Whitaker, Benton County, Wash.

[73] Assignee: Atom Sciences, Inc., Oak Ridge, Tenn.

[21] Appl. No.: 544,531

[22] Filed: Oct. 24, 1983

[51] Int. Cl.[4] ............................................. G21C 17/00
[52] U.S. Cl. ..................................... 376/254; 376/153; 376/154; 376/255; 250/390; 250/392
[58] Field of Search ............... 376/154, 254, 153, 255; 250/390 B, 391, 392, 472.1

[56] References Cited

U.S. PATENT DOCUMENTS

| | | | |
|---|---|---|---|
| 3,822,184 | 7/1974 | Weiss | 376/254 |
| 3,878,108 | 4/1975 | Burghhardt et al. | 250/390 B |
| 3,885,159 | 5/1975 | Jahn et al. | 250/472.1 |
| 3,894,238 | 7/1975 | Cox et al. | 250/390 B |
| 4,163,240 | 7/1979 | Swinehart et al. | 250/390 B |
| 4,235,670 | 11/1980 | Alzaidi | 376/255 |
| 4,381,454 | 4/1983 | Griffith et al. | 250/390 B |
| 4,383,179 | 5/1983 | Eisen et al. | 250/392 |
| 4,445,036 | 4/1984 | Selph | 250/390 B |
| 4,489,315 | 12/1984 | Falk et al. | 250/392 |
| 4,536,841 | 8/1985 | Waechter et al. | 250/392 |

OTHER PUBLICATIONS

J. Appl. Phys., vol. 48, No. 9, (9/77) Behrish et al., pp. 3914-3918, "Sputtering of Niobium by . . . Neutrons".
J. Appl. Phys., vol. 48, No. 10 (10/77) Harling et al., pp. 4315-4327, "Fast Neutron Sputtering of Niobium".

Primary Examiner—Salvatore Cangialosi
Attorney, Agent, or Firm—Pitts and Brittian

[57] ABSTRACT

A dosimeter which incorporates new methods for determining neutron dose. Less than one millirad of dose due to neutrons of all energies down to approximately $10^3$ eV can be measured, and the response can be adjusted by design of the dosimeter. The dosimeter utilizes the sputtering of material from a target due to the action of the neutrons and measuring of the amount of sputtered material to determine the dose. The sputtered material may be, for example, a noble gas or an inert solid. Various radiator materials can be included to interact with the neutrons so that the resulting charged particles control the sputtering process and hereby increase the sensitivity of the dosimeter. The target material can be, for example, noble-gas-impregnated polycrystalline or amorphous metals. The sputtered material is analyzed using resonance ionization spectroscopy, sputter-initiated resonance ionization spectroscopy or other methods to determine its quantity and hence the neutron dose. Applications include, but are not limited to, personnel neutron dosimetry and stationary neutron monitors.

20 Claims, 5 Drawing Figures

NEUTRON DOSIMETER

DESCRIPTION

1. Technical Field

This invention relates generally to devices for measuring neutron fluence, neutron exposure dose in rad units, and neutron biological dose in rem units, and more particularly to devices to measure these quantities over a wide spectrum of neutron energies, e.g., from thermal to $10^7$ eV, including the difficult region of $10^3$ ev to $10^6$ ev, with sufficient sensitivity to cover the range from less than 1 mrad to many megarads.

2. Background Art

Approximately thirty thousand workers are involved in the nuclear industry in the United States. Many thousands more are involved throughout the world. These workers wear a "badge" containing materials which serve as a dosimeter for the various types of possibly harmful radiation encountered by these persons. A personnel neutron dosimeter (PND) may be included in the badge to indicate the levels of neutron exposure.

The measurement of very low levels of neutron exposure is a matter of renewed concern especially at low neutron energies below about 100 keV. New information on relative biological effectiveness calls for the reduction of the neutron exposures received by personnel in the nuclear industry. This is particularly true because large numbers of the occupational workers are involved in pressurized water reactor operations where low energy neutrons may be present. None of the known existing dosimeters or neutron measurement devices have the desired combination of sensitivity, rejection of gamma radiation, response to low energy neutrons and stability.

Accordingly, it is the primary object of the present invention to provide a dosimeter which may be worn by personnel to measure extremely low doses of neutrons, even at low energies. It is also an object of this invention to provide a sensitive neutron dosimeter for low dose measurement which discriminates against electromagnetic radiation such as gamma radiation. It is also an object of the invention to provide a neutron dosimeter for low doses of low energy neutrons that has high stability and is easily fabricated. It is another object of the invention to provide a dosimeter which will permit the measurement of neutron doses over a wide range to levels as low as a few microrads of exposure to tissue.

It is an additional object of this invention to provide a device to measure the neutron flux or the neutron fluence over a wide range of energy to be placed in a device which may or may not be worn by personnel. It is a further object of this invention to provide a device to measure the biological dose in rem units, particularly for the applications of a PND. Other applications of the fluence meter, the rad meter or the rem meter may not involve their use on personnel, since they can also be used as stationary field devices either for the protection of personnel, for research, and for testing applications.

Further objects of the invention will become apparent upon a consideration of the drawings and the description of the embodiments hereinafter.

DISCLOSURE OF THE INVENTION

In accordance with the invention, a neutron dosimeter is provided for determining extremely low doses of exposure. In the broadest embodiment of the invention, the present dosimeter includes a source material containing atoms which are ejected, e.g., sputtered, from the source material in response to the neutrons. The sputtered material, which may be gaseous or solid, is then measured as a value of the dose of the impinging neutrons. By appropriate choice of source materials, together with appropriate radiator and absorber materials, dosimeters can be constructed whose sensitivity varies with neutron energy as the fluence, the rad dose, or the rem dose. Any of these choices of energy dependence may be desirable according to the application to be made of the dosimeter.

In a specific embodiment of the invention, the dosimeter contains a radiator material which emits protons or other recoil atoms in proportion to the neutrons. These recoils impinge on a solid matrix in which a noble gas such as xenon is incorporated. A very small fraction of the xenon is emitted (sputtered) by the action of the protons and the quantity thereof is then measured as an indication of the dose received by the detector. The measurement can be performed, for example, by using a method based on Resonance Ionization Spectroscopy (RIS).

BEST MODE FOR CARRYING OUT THE INVENTION

Figure 1:
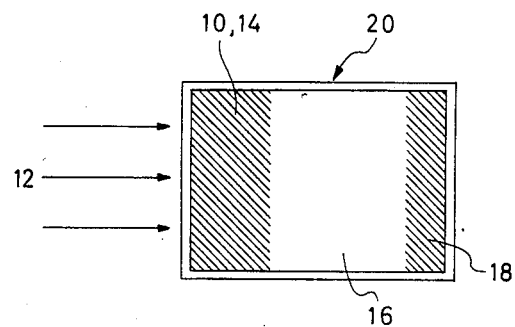
FIG. 1 is a schematic drawing illustrating the most general form of the present invention consisting of a source material and a collector for sputtered atoms. These are shown within an optional enclosure.

Referring now to FIG. 1, shown therein is the most general form of the present invention. A target 10 is provided for interception of neutrons 12. This target contains, therein or thereon, a material 14 which is characterized by being sputtered from the target in response to the neutron irradiation of the dosimeter. Material sputtered from the target can be in the form of a gas or a solid. Accordingly, the drawing illustrates a gas collection region 16 and a solids collector 18 which are used for these sputtered materials, respectively. Although not necessary for all embodiments, the target 10 (and the sputterable material 14), together with the collectors 16 or 18, are encased in a thin enclosure 20. This enclosure, typically thin plastic or metal, can be evacuated if desirable. Although the neutron field 12 is shown as being unidirectional, the dosimeter of the present invention has non-directional response unless affected by its physical location.

The sputtered material, either in the form of gas or solid, is collected for sensitive analysis. Typical gaseous materials could be atomic gases like helium, neon, argon, krypton, xenon or radon, or molecular gases such as hydrogen, ($H_2$), nitrous oxide (NO) or carbon monoxide (CO). In dosimeters where the sputtered material is a solid, the solid could be a noble metal such as gold, or a stable alkali halide such as lithium iodide (LiI). Many or all atoms in the sputterable materials can be normally abundant isotopes, enriched stable isotopes, or radioactive elements. As indicated above, the sputtered material is analyzed by any suitable means to determine the quantity thereof and therefore to provide information as to the quantity (dose) of neutrons that are impinging (or impinged) upon the dosimeter.

The target 10 utilized in this most general embodiment of the present invention, as well as in the other embodiments to be disclosed hereinafter, should have certain characteristics. For example, the target should be such that the material to be sputtered therefrom is relatively easily incorporated therewith. The combination of the target and the material to be sputtered should normally be stable under all conditions whereby the sputtered material is released only upon the interaction with radiation. Lastly, the matrix material must be such that a sufficient quantity of the material to be sputtered therefrom can be incorporated therein or thereon whereby the resultant dosimeter has sufficient sensitivity to meet the goals of low level neutron dosimetry.

Figure 2:
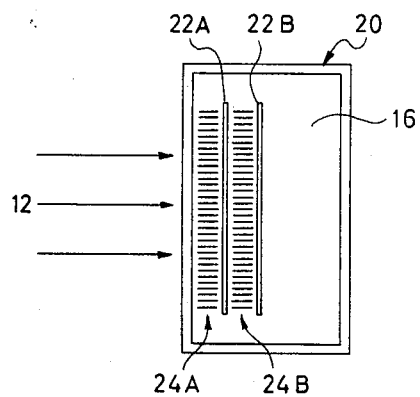
FIG. 2 is a schematic drawing of a particular embodiment of the invention in which films containing xenon gas are incorporated with a particle radiator in a package for use as a neutron dosimeter.

A more specific embodiment of the present invention is illustrated schematically in FIG. 2. Positioned within the enclosure 20 are numerous thin films 22A, 22B of matrix material which contain xenon gas deposited therein or thereon by appropriate techniques. Interposed with the films 22 are numerous radiators of charged particles, two of which are labelled 24A, 24B. These radiators may be, for example, flakes or extended surfaces of a hydrogeneous material, or even a hydrogeneous liquid, which gives up protons or other recoil atoms upon being bombarded with the neutrons 12. The recoil atoms, upon striking the films 22, cause a portion of the xenon to be released into void space 16 within the enclosure 20. This liberated xenon gas is then subjected to one of several analytical methods to determine the quantity thereof and therefore to determine the dose of the impinging neutrons. Because of the gaseous nature of the sputtered material in this embodiment, the enclosure 20 is preferably evacuated.

Xenon gas can be incorporated into various materials for use in this embodiment in several ways. For example, xenon ions can be accelerated to about 10 keV to impinge upon the substrate material, for example, a metal foil. This causes the xenon ions to penetrate into the first few atomic layers of the solid. The number of atoms which can be trapped by ion implantation is about $10^{15}$ per square centimeter. Another method which can be used is sublimation in which neutral atoms on the surface are covered with atoms from a filament or a sputter source. During the sublimation the noble gas becomes entrapped. A further method of incorporation is the mechanism known as plasma injection or bias sputtering process. In this process, the noble gas is ionized in an electrical discharge and some of these ions strike the surface and are momentarily retained while other ions sputter a target material which covers the implanted atoms. If the target material is a mixture of two metals containing atoms of two sizes, an amorphous film is grown on the substrate. This film, if formed in the presence of a noble gas, will contain a significantly large amount of the noble gas which is known to be very stably retained even at high temperatures.

Accordingly, the technology is known relative to the incorporation of a large number of xenon atoms into a matrix material for use with the subject dosimeter. Sufficient atoms of xenon can be incorporated in the matrix such that one rad of fast neutrons impinging upon the dosimeter will liberate approximately $10^8$ atoms, the resultant dosimeter provides a measurement for $10^{-5}$ rads. These levels of exposure can be measured using the device described in U.S. patent application Ser. No. 300,019, filed Sept. 8, 1981, now U.S. Pat. No. 4,426,576, which device is incorporated herein by reference. Even static mass spectrometers without resonance ionization spectroscopy can measure on the order of $10^7$ xenon atoms, and thus less than 1 rad of radiation is easily detectable with this dosimeter.

The "rad", as used herein and well known in the art, is a unit of energy absorbed from ionizing radiation and is equal to 100 ergs per gram of irradiated material. A millirad is $10^{-3}$ rad, and a microrad is $10^{-6}$ rad. The rem is a unit used for biological dose, and is equal to the rad of exposure multiplied by a quality factor that depends on neutron energy.

Figure 3:
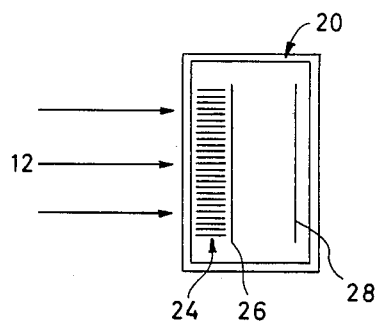
FIG. 3 is a schematic drawing of another embodiment of the invention in which the dosimeter contains a noble metal which is released upon interaction of neutrons with a particle radiator and the collection of the sputtered noble metal which is a measure of the exposure dose.
Figure 4:
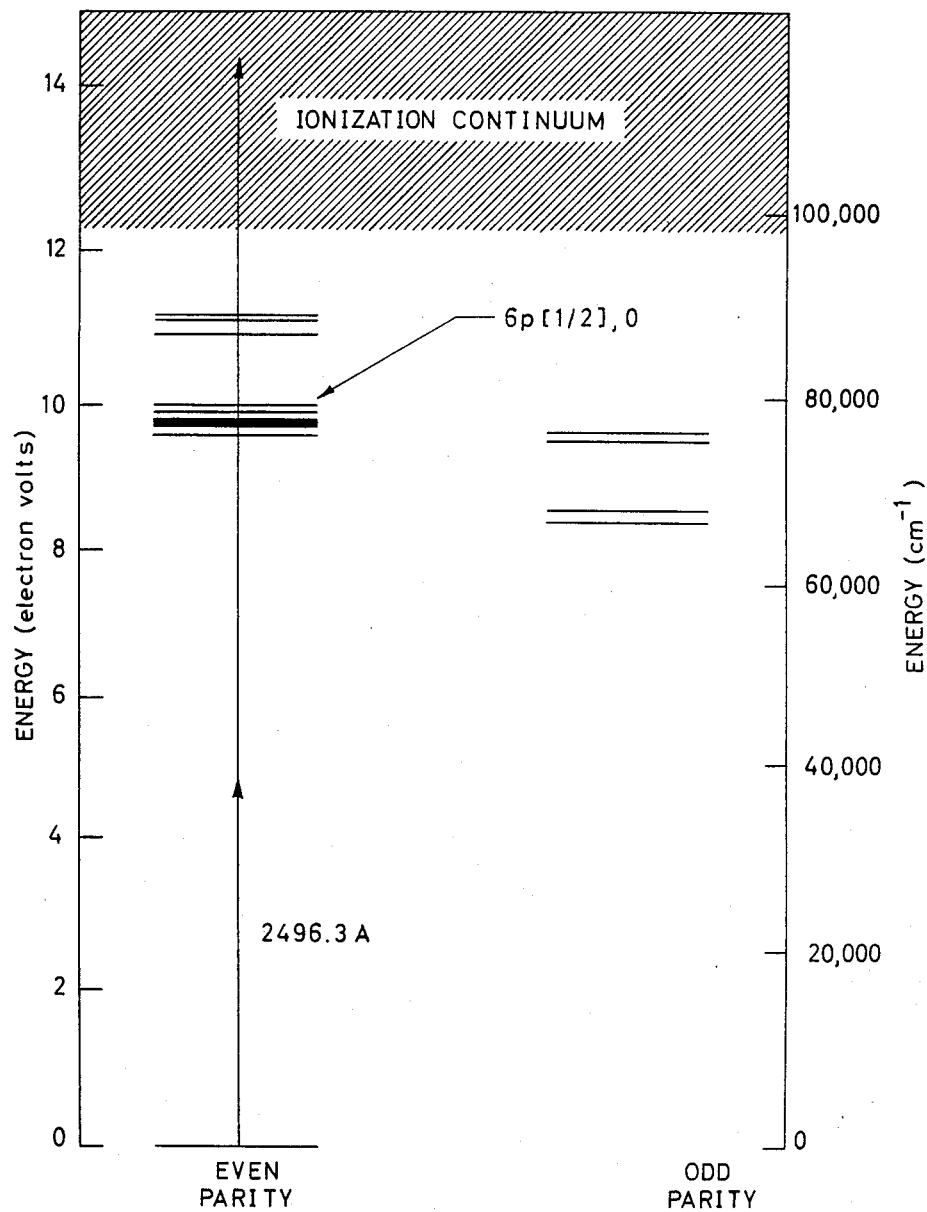
FIG. 4 is a schematic drawing illustrating the energy levels of xenon and the example where a two photon excitation, followed by photoionization, is used for the resonance ionization spectroscopy analysis of xenon to determine the neutron dose received by the dosimeter of the present invention.

An embodiment illustrating the sputtering of a metal is shown in FIG. 3. As in the embodiment of FIG. 2, a radiator material 24 is encompassed within an enclosure 20. Adjacent to the radiator material is a deposit of a metal 26, such as gold. Spaced from the gold surface is a collector plate 28 which is initially substantially free of gold. In this embodiment, the enclosure 20 is evacuated. The gold, when sputtered from foil 26 by particles from the radiator 24, is deposited upon the collector plate 28. This collector plate is then removed and analyzed at a given time interval to ascertain the amount of gold deposited thereon. This transferred amount of gold is then relatable to the neutron dose. The gold surface 26 may be in the form of gold foils or, more practically, a thin evaporated layer of gold upon a suitable substrate.

With the embodiment shown in FIG. 3, a higher yield of atoms per rad of radiation is to be achieved. This is due to two factors: (1) there are 100 times more gold atoms per square centimenters of surface than in the xenon case shown in FIG. 2; and (2) the sputter yield of gold is intrinsically large, e.g., one atom per ion at low energy rather than 0.1 atom achieved with the xenon detector. Accordingly, this provides approximately $10^8$ gold atoms per square centimeter per rad transferred to the collector plate 28. The quantity of gold on the collector plate can be determined using sputter initiated resonance ionization spectroscopy by which approximately 10% of all of the atoms on the surface of the collector can be counted. Sputter initiated resonance ionization spectroscopy (SIRIS) is described in U.S. patent application Ser. No. 341,895, filed Jan. 22, 1982, now U.S. Pat. No. 4,442,354, the contents thereof being incorporated herein by reference. Other known techniques of analysis can provide a counting of about $10^{-4}$ of the total atoms.

As stated above, the collector plate 28 initially must be substantially free of gold. An electronic grade silicon can be used which contains less than one portion of gold per $10^{10}$ portions of silicon. A one square centimeter silicon crystal would have about $10^{15}$ atoms of silicon on the surface but only about $10^5$ gold atoms. This amount of gold would create only about 1 millirad of background per square centimeter of material analyzed. There are other metals and various oxides that also have a low amount of gold therein and these would permit a detection of low levels of neutron irradiation.

Also a surface deposition of lithium iodide (LiI) can be used in a similar fashion to the gold sputtering whereby the sputtered material is collected on a surface that is initially free of lithium iodide. Thereafter the collector is analyzed for the quantity of the sputtered material. A sodium iodide (NaI) surface can be used for the collection of LiI.

A dosimeter with a noble gas implanted in a metal matrix, with the gas as the sputterable material, was chosen for careful study. Specifically the noble gases were selected because of their nonreactivity with other materials. Of the rare gases, xenon was studied in particular because of the availability of known analytical techniques for this element. Both polycrystalline and amorphous type metals for the incorporating of the gas were studied. With the polycrystalline metals, the gas is held at many types of sites within the structure, some being more easily emptied than other sites. Accordingly, preannealing of the substrate is necessary to remove any gas that is too easily separated from the matrix and which would not be related to a release due to the radiation interaction. Amorphous metal compositions, as discussed above, apparently have a large number of interstitial spaces large enough to hold a foreign gaseous atom. These gas atoms remain trapped until the structure rearranges on crystallization. Accordingly, gaseous atoms are tightly bound by such amorphous materials and therefore the gas is released only upon the reaction of the radiation upon the matrix material. A lower background of gas that is not due to radiation will exist in a dosimeter fabricated from this material. Such a dosimeter will be more stable than those utilizing the polycrystalline metal as the sites for the gaseous atoms.

Methods are known for producing amorphous alloys using a noble gas. In such methods two or more metals, where the radii of the various metals differ substantially, are simultaneously sputtered upon a substrate. When the sputtering is performed in the presence of a noble gas, such as xenon, the noble gas is trapped in a high degree and is held very stably in the resultant material. Typical compositions involve a binary alloy of gadolinium and cobalt or a ternary alloy of Gd-Co-Cr. Another amorphous material which is suitable for retaining the noble gas is a composition of 20% mischemetal, 60% iron and 20% chromium. The mischemetal contains rare earth elements of large atomic radii and iron, having a small radius, serves to disorder the structure of the growing film in the radiofrequency plasma deposition process. The chromium of the composition protects the rare earths against oxidation and thus chemically stabilizes the film. Within this general composition, a tantalum-iron-chromium amorphous alloy has been prepared. Specifically, a deposit of about 1500 angstroms of this alloy was deposited upon a stainless steel substrate using an argon discharge. A cover layer of similar thickness of the same alloy was then deposited in a xenon discharge. Subsequent analysis showed a significant retention of xenon in the second layer which was not released under normal heating conditions to any appreciable degree. This substrate had approximately 30% concentration of the xenon.

In those cases where the sputtered material is a solid, it is accumulated on a collector as described above. This collector is removed from the dosimeter, and the quantity of sputtered material is determined by suitable means. One such means is a sputter initiated resonance ionization spectrometer as described in the aforementioned U.S. Pat. No. 4,442,354.

One typical construction for a dosimeter is a structure having alternating layers of a hydrocarbon, such as $(C_2H_2)n$, and thin films of amorphous metal alloy containing xenon gas. A typical hydrocarbon for this application is polyethylene. The films of amorphous metal are of the order of 10–100 angstroms in thickness. The range of a 10 keV proton is about 2000 angstroms in nickel metal. Thus, each proton will enter and exit many of the thin metal films. On each entry and on each exit of the proton into or from each film there is about a 1% probability that a xenon atom will be sputtered from the metal and these atoms will collect in the spaces allowed between the hydrogenous radiators and the metal films. The sensitivity of the dosimeter is increased by the number of films traversed by the proton. Using these figures, about $2 \times 10^9$ xenon atoms will be released per rad of radiation incident upon the dosimeter. Thus, in the absence of background, doses well below a millirad can be detected. A further enhancement of the release of xenon from the matrix material is affected by forming the xenon-containing amorphous metal alloy into flakes and mixing these flakes with small plastic (radiator) particles which particles supply protons for the sputtering of the xenon. As above, liberated xenon atoms will collect in the voids and can be easily transferred to other apparatus to determine the concentration of the xenon atoms. Since a conventional quadrupole mass spectrometer alone can measure $10^6$ atoms, one millirad sensitivity is achieveable. With a resonance ionization mass spectrometer, $10^3$ atoms are easily measured and hence will provide means for determining one microrad of neutron exposure.

Alternately, these same metal alloy flakes can be mixed with a suitable hydrocarbon liquid, the liquid now supplying the protons and heavier particles for the sputtering of the xenon. The xenon collects in the liquid and can easily be removed and transferred to an analysis system as above.

Figure 5:
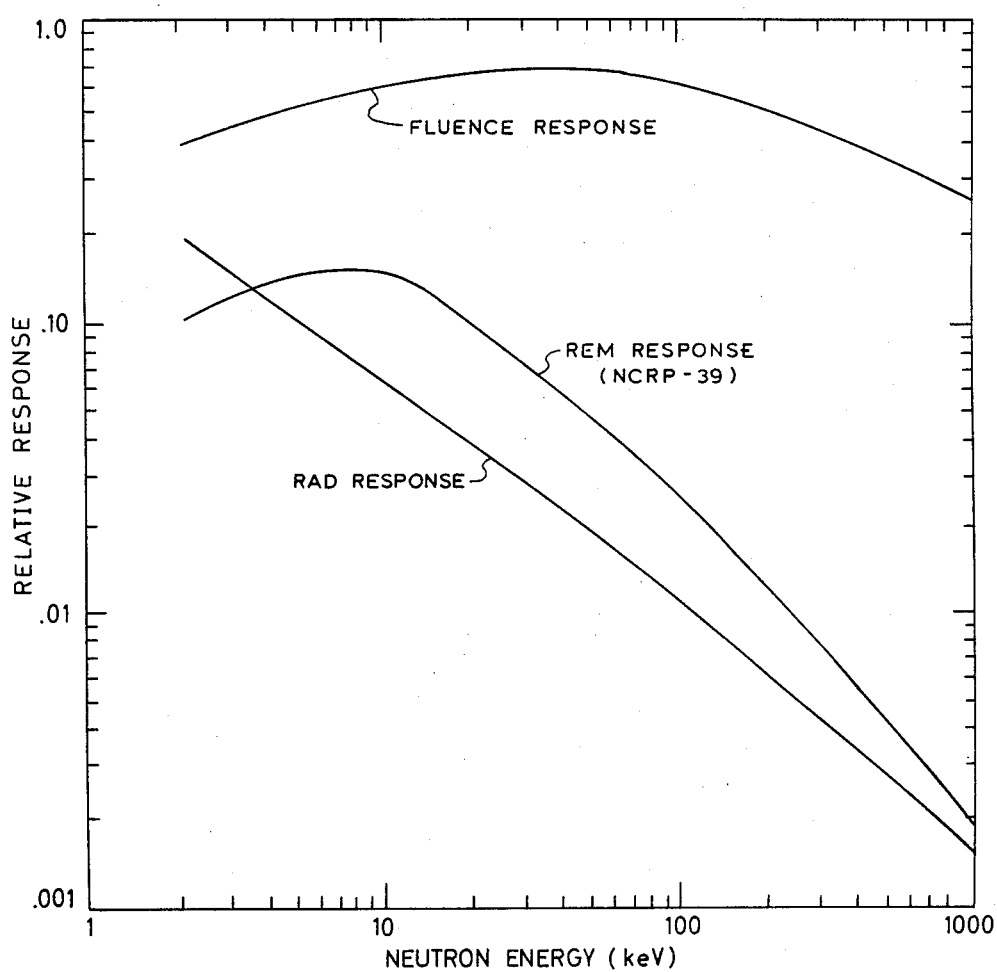
FIG. 5 illustrates the relative yield of sputtered Xe atoms from a simple planar stack of alternating hydrocarbon and metal foils per unit dose (rad, rem, or fluence) as a function of incident neutron energy as used in certain embodiments of the present invention.

In FIG. 5 are shown the results of a theoretical calculation of the relative number of xenon atoms that would be liberated, a dosimeter of the type shown in FIG. 2, per rad of neutron absorbed dose in a tydrogen-containing radiator as a function of neutron energy. The undesirable decline in sensitsivity is due to the fact that the sputter yield for protons peaks and then declines for energies above about 1 keV. However, for recoil atoms of masses greater than hydrogen, the sputter yield rises to a higher value of neutron energy before it declines. By choice of radiator material composition, dosimeters can be designed so that the response per rad is independent of neutron energy over the range from $10^3$ ev to $10^6$ ev. Similarly, another preselected composition of radiator material would make the biological dose measured in rem units more constant than that shown in FIG. 5. Even for the simple configuration of FIG. 2, the total number of neutrons passing through a unit of area (the fluence) is almost constant requiring little adjustment of composition.

From the foregoing it will be understood by those versed in the art that a useful personnel neutron dosimeter is provided for use where very low doses are to be determined for low energy neutrons. Through the choice of appropriate materials, high sensitivity in the determination of the neutron doses is achieved. Significant discrimination against electromagnetic radiation is achieved with the present dosimeter since electromagnic radiation produces electrons instead of heavy particles, and heavy particles produce a substantially greater sputtering of material. The neutron-sputter dosimeter, as described herein, may be incorporated as an element into any conventional device worn by personnel in environments where they may be subjected to low levels of neutron irradiation. Furthermore, other applications may not involve devices worn by personnel. For instance, devices according to the present invention can be used to indicate the fluence of neutrons at a fixed location. Absorbed dose in materials exposed to neutrons can be measured by using small dosimeters of the invention integrated into more complex equipment.

It is, of course understood that although preferred embodiments of the present invention have been illustrated and described, various modifications thereof will become apparent to those skilled in the art. Accordingly, the scope of the invention should be defined by only the appended claims and the equivalent thereof.

We claim:

1. A neutron dosimeter to determine the magnitude of dose or fluence of neutrons having energies from a few ev of $10^7$ ev with sufficient sensitivity to cover a range from less than 1 mrad to several megarads, which comprises:
   a solid target, said target containing at least a matrix material and a sputter material, said matrix material characterized by stably retaining said sputter material, said sputter material characterized by being sputtered from said target as a result of said neutrons as an indicator of said magnitude of said dose or fluence of said neutrons;
   a collector for said sputter material sputtered from said target, the quantity of said sputter material at said collector being a measure of said magnitude of said dose or fluence;
   wherein said matrix material is selected from a group consisting of polycrystalline metals, amorphous metals and silicon; and
   wherein said sputter material is selected from a group consisting of noble gases, noble metals and alkaline halides.

2. The neutron dosimeter of claim 1 further comprising at least one radiator material proximate said target, said radiator material producing recoil particles upon exposure to said neutrons, said recoil particles enhancing sputtering of said sputter material from said target.

3. The neutron dosimeter of claim 1 wherein said target comprises a substrate and a surface deposition on said substrate, said surface deposition containing said sputter material.

4. The neutron dosimeter of claim 3 wherein said sputter material in said surface deposition is a noble gas.

5. The neutron dosimeter of claim 1 wherein said sputter material is a noble gas.

6. The neutron dosimeter of claim 5 wherein said noble gas in an isotopic specie.

7. The neutron dosimeter of claim 5 wherein said noble gas is xenon.

8. The neutron dosimeter of claim 5 wherein said collector for said sputtered material is an enclosure for said target, said enclosure being initially substantially free of said noble gas.

9. The neutron dosimeter of claim 1 wherein said sputter material is a noble metal.

10. The neutron dosimeter of claim 9 wherein said noble metal is gold.

11. The neutron dosimeter of claim 2 wherein said radiator material is selected to achieve a selected energy response to said neutrons.

12. The neutron dosimeter of claim 2 wherein said radiator material comprises ordered layers of recoil particle radiator material, and wherein said target and said radiator material are encompassed in an enclosure.

13. The neutron dosimeter of claim 2 wherein said radiator material comprises small particles of recoil particle radiator material, and said target comprises small particles, said small particles of radiator material being randomly mixed with said small particles of said target.

14. The neutron dosimeter of claim 2 wherein said radiator material is a liquid, and said target comprises small particles suspended in said liquid radiator, and further comprises an enclosure for said liquid radiator containing said small particles of said target.

15. The neutron dosimeter of claim 1 wherein said matrix material is a polycrystalline metal, and said sputter material is a noble gas entrapped in said matrix.

16. The neutron dosimeter of claim 1 wherein said matrix material in an amorphous metal, and said sputter material is a noble gas entrapped in said matrix.

17. The neutron dosimeter of claim 1 wherein said matrix materials is silicon, and said sputter material is a noble gas entrapped in said matrix.

18. The neutron dosimeter of claim 2 wherein said radiator material is a hydrocarbon.

19. A neutron dosimeter to determine the magnitude of dose or fluence of neutrons having energies from a few ev to $10^7$ ev with sufficient sensitivity to cover a range from less than 1 mrad to several megarads, which comprises:
   a target, said target containing at least a matrix material and a sputter material, said matrix material characterized by stably retaining said sputter material, said sputter material characterized by being sputtered from said target as a result of said neutrons as an indication of said magnitude of said dose or fluence of said neutrons;
   a collector for said sputter material sputtered from said target, the quantity of said sputter material at said collector being a measure of said magnitude of said dose or fluence;
   at least one hydrogenous radiator material proximate said target, said radiator material producing recoil particles upon exposure to said neutrons, said recoil particles enhancing sputtering of said sputter material from said target;
   an enclosure for said target and said radiator material;
   wherein said matrix material is selected from a group consisting of polycrystalline metals, amorphous metals and silicon; and
   wherein said sputter material is selected from a group consisting of noble gases, noble metals and alkaline halides.

20. A neutron dosimeter to determine the magnitude of dose or fluence of neutrons having energies from a few ev to $10^7$ ev with sufficient sensitivity to cover a range from less than 1 mrad to several megarads, which comprises;

a target, said target containing amorphous metal particles as a matrix and a noble gas entrapped in said amorphous metal particles;

a hydrocarbon radiator intimately mixed with said amorphous metal particles; and a collector for noble gas sputtered from said amorphous metal particles as a result of said neutrons, the quantity of said collected noble gas being a measure of said magnitude of said dose or fluence; and and enclosure surrounding said target; said radiator and said collector.

* * * * *